United States Patent Office 2,744,861
Patented May 8, 1956

2,744,861

REGENERATION OF CATALYSTS

Charles L. Thomas, Winnetka, Ill.

No Drawing. Application December 6, 1951,
Serial No. 260,323

3 Claims. (Cl. 204—72)

This invention relates to the regeneration of catalysts and more particularly to the regeneration of catalysts of the type used for the alkylation of hydrocarbons in which the catalyst is a liquid under conditions of use.

In the alkylation of hydrocarbons, the use such catalysts as concentrated sulfuric acid and concentrated phosphoric acid is well known and is widely practiced in processes for making aviation gasoline, raw materials for synthetic rubber, etc. For convenience in the following discussion, these acids are referred to briefly as "acids."

If one starts with fresh "acid," upon addition to hydrocarbon material, some of the hydrocarbon combines with the acid, to form a liquid, hydrocarbon-acid, catalytic material insoluble in paraffin hydrocarbons. This hydrocarbon-acid liquid is active as an alkylating catalyst. As catalytic reaction proceeds, more hydrocarbon enters and remains in the hydrocarbon-acid liquid and its catalytic activity declines and becomes progressively less useful as a catalyst as a result of fouling by said hydrocarbon entering and remaining in the hydrocarbon-acid phase.

In commercial practice, it is common practice to withdraw, more or less continuously, used acid catalyst and add fresh acid.

These hydrocarbon-acid phases are well known and have been variously referred to as "sludges," "lower-layers," etc.

Besides the hydrocarbon that gets into the acid catalyst phase, small quantities of water also get in and deactivate the catalyst.

Many processes have been proposed for regenerating these catalysts and some of them are in commercial use. In general, they are expensive in that they require complicated plant equipment which is relatively expensive to operate. Some are so costly that it would be cheaper to use fresh acid if there were some way to dispose of the sludge without becoming a public nuisance.

It is one object of my invention to provide a new and improved method of the regeneration of sulfuric acid catalysts and phosphoric acid catalysts by removing the hydrocarbons responsible for their deactivation. It is a further object to provide a method of regenerating such catalysts by removing the water responsible for the deactivation.

In its broadest sense, my invention comprises subjecting spent or partially spent liquid acid catalysts to the action of a direct electric current for a length of time sufficient to cause the separation of some of the hydrocarbon from the hydrocarbon-catalyst phase, removing the separated hydrocarbon, and recovering the regenerated catalyst.

I have found that these "sludges," "lower layers," etc., i. e., hydrocarbon-acid phases, are remarkably good conductors of electricity. In some respects they may be said to resemble inorganic salts dissolved in water. As with such salts, chemical reactions occur at the cathode and anode as a result of the passage of direct electric current. I do not know the nature of the reactions occurring in the catalyst-hydrocarbon systems. I have found, however, that whatever reactions do occur, result in increasing the acid content of the catalyst and increasing the catalytic activity. In handling the fouled catalysts and in regenerating them by my method I prefer to exclude oxygen or air.

As is well known, the acid catalysts are corrosive toward most metals. Because of this I have used carbon or graphite anodes and cathodes in my process. These seem to work satisfactorily even though their porosity is a little inconvenient.

The following example is given to illustrate how my invention may be used:

*Example*

One liter of almost spent sulfuric acid catalyst was taken from a plant alkylating isobutane with mixed butylenes. The acid has an apparent acidity of 88% $H_2SO_4$. The acid was kept cool, about 40–50° F., to prevent thermal changes from taking place. A direct current of thirty amperes was passed through the hydrocarbon-acid system through wide carbon plates. The current passage was continued for about an hour. Gases of an undetermined nature and quantity were observed. The electrodes were removed and the liquid system transferred to a separating funnel which was still kept cool. In about one hour, a hydrocarbon oil separated at the top and was removed. The acid phase now showed an apparent acidity of 92% $H_2SO_4$ and was more active as a catalyst for alkylation than it was before the electrical treatment.

My method can be used for regenerating a sulfuric acid catalyst or a phosphoric acid catalyst even though they may not have been used actually for alkylation. My method may be used in any process in which the acid is contacted with hydrocarbon or other organic materials and becomes unfit for further use because of organic material dissolved in or combined with the acid.

I have found that sulfuric acid used for acid treating gasoline or for acid treating benzene can be reactivated by my method. I have also found that sulfuric acid used for polymerizing olefins can be improved for reuse by my method of treating.

In applying my process on a commercial scale, a side stream of the liquid catalyst may be withdrawn from the reactor and passed through an electrolysis cell in which it is regenerated. The side stream can then be returned to the reactor. Alternatively, the stream may be sent to a settler where the liberated oil is collected and removed. The regenerated catalyst may then be returned to the reaction zone.

It is also within the scope of my invention to install electrodes right in the reactor system so the catalyst is regenerated in situ. In this case the oil that is liberated during the regeneration is removed with the product.

I have collected samples of the oil, and while it varies in properties, as might be expected, I have found that it is highly unsaturated. It has certain "air-drying" properties similar to the unsaturated vegetable oils. To a certain extent, the oil will unite with maleic anhydride, indicating conjugated double bonds in the oil. The oil is useful in paint, varnish, and resin formulations.

I claim as my invention:

1. Method of regenerating liquid, hydrocarbon-acid catalytic material which has become fouled by combination with organic material while in use in a hydrocarbon process, the acid being selected from the group consisting of concentrated sulfuric acid and concentrated phosphoric acid, which comprises passing a direct electric current through the fouled liquid catalyst for a time sufficient to effect separation of phases after discontinuing the passage of electric current as recited hereinafter, discontinuing the passage of electric current through the catalytic material, effecting separation of the so-treated catalytic material into a lower layer of liquid, hydrocarbon-acid catalytic material of enhanced catalytic activity and an upper layer of unsaturated hydrocarbons, and separating said lower layer from said upper layer.

2. Method according to claim 1 wherein the acid selected is concentrated sulfuric acid.

3. Method according to claim 1 wherein the acid selected is concentrated phosphoric acid.

References Cited in the file of this patent

UNITED STATES PATENTS

| 1,992,310 | Hultman | Feb. 26, 1935 |
| 2,463,610 | Glassmire et al. | Mar. 8, 1949 |